United States Patent
Brockelt et al.

(10) Patent No.: US 7,790,804 B2
(45) Date of Patent: Sep. 7, 2010

(54) PROCESS FOR STRIPPING POLYMER POLYOLS

(75) Inventors: Michael Brockelt, Leverkusen (DE); Ludwig Deibele, München (DE); Manfred Dietrich, Frankfurt (DE); Markus Hadley, Pulheim (DE); Jan Thomas Leu, Leichlingen (DE); Guido Naberfeld, Upper St. Clair, PA (US); Ralf Dohrn, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 352 days.

(21) Appl. No.: 11/821,456

(22) Filed: Jun. 22, 2007

(65) Prior Publication Data

US 2008/0033139 A1 Feb. 7, 2008

(30) Foreign Application Priority Data

Jun. 26, 2006 (DE) .................. 10 2006 029 588

(51) Int. Cl.
*C08L 29/04* (2006.01)
(52) U.S. Cl. .............. 525/57; 525/71; 526/68; 526/341; 526/346; 526/347.1; 528/500; 528/500 R; 523/328
(58) Field of Classification Search .......... 528/500, 528/501, 502 R, 85, 272, 499, 480; 536/127; 521/137, 155, 170; 526/68, 346, 347.1, 341; 525/57.71
See application file for complete search history.

(56) References Cited

U.S. PATENT DOCUMENTS

| 4,404,121 A * | 9/1983 | Klein et al. ............ 502/167 |
| 5,332,477 A * | 7/1994 | Iyer et al. ............. 203/20 |
| 5,925,687 A | 7/1999 | Guettes et al. ........ 521/137 |
| 6,060,627 A * | 5/2000 | Valbert ............... 568/852 |
| 6,096,858 A | 8/2000 | Dobbelaar et al. .... 528/499 |
| 6,245,947 B1 * | 6/2001 | Guettes et al. ........ 568/579 |
| 6,455,603 B1 * | 9/2002 | Fogg .................... 521/137 |
| 6,575,437 B2 * | 6/2003 | Fischer et al. .......... 261/97 |
| 6,875,406 B1 | 4/2005 | Hübinger et al. ....... 422/144 |
| 7,179,882 B2 * | 2/2007 | Adkins et al. .......... 528/272 |
| 2005/0161316 A1 | 7/2005 | Hubinger et al. ....... 202/158 |
| 2005/0245724 A1 * | 11/2005 | Horiguchi et al. ...... 528/425 |
| 2006/0100404 A1 * | 5/2006 | Gust et al. ............ 526/230.5 |

FOREIGN PATENT DOCUMENTS

| DE | 197 16 373 A1 | 10/1998 |
| DE | 198 30 171 C1 | 9/1999 |
| EP | 982 341 B1 | 5/2003 |
| JP | 56-104936 | 8/1981 |
| WO | WO/98/52988 | 11/1998 |
| WO | 2006/110697 A2 | 10/2006 |

* cited by examiner

*Primary Examiner*—Milton I Cano
*Assistant Examiner*—Michael Leonard
(74) *Attorney, Agent, or Firm*—Lyndanne M. Whalen; Noland J. Cheung; John E. Mrozinski, Jr.

(57) ABSTRACT

The invention provides a process for the purification of polymer polyols that ensures a reduction of acrylonitrile, styrene as well as the residual amounts of optionally used chain regulator, and of occurring recombination products of the initiator when azo initiators are used, to levels of <25 ppm of acrylonitrile, <50 ppm styrene, <50 ppm chain regulator and <280 ppm of recombination products by stripping using packed columns.

10 Claims, 2 Drawing Sheets

PROCESS FOR STRIPPING POLYMER POLYOLS

FIELD OF THE INVENTION

The present invention relates to a process for the purification of polymer polyols by stripping using packed columns.

BACKGROUND OF THE INVENTION

For ecological and toxicological reasons, but also to minimize the so-called fogging effect (deposition of thin but highly light-refracting films on the insides of glass panels/windscreens by heat-induced migration of volatile substances from the used materials) caused by plastics parts incorporated in automobile interiors, the thorough removal of volatile constituents such as residual monomers, chain regulators or low molecular weight reaction products such as recombination or reaction products of the employed polymerization initiator is becoming increasingly important also in the production of polymer-filled polyether polyols ("polymer polyols"; "PMPO"). In particular as regards the European market, it is at the same time important that the polymer polyols do not in this connection suffer from too serious a discoloration (yellowness index <25, measurement according to DIN 5033, calculation according to DIN 6167 and ASTM E 313). For this reason none of the normally employed methods, such as for example the use of thin film evaporators, is possible, because temperatures of >160° C. are necessary to achieve the desired separation result.

It is known from WO 00/00531 and WO 98/52988 that polymer polyols are subjected to a purification step after the free-radical polymerization of the unsaturated monomers used for the filling and after a post-reaction time. Vacuum stripping is suggested for this purpose, although no specific procedure or process conditions are given.

The purification and deodorization of polyether polyols and aqueous polymer dispersions is however well described in the prior art. The processes described there, such as vacuum stripping (vacuum flashing), vaporization in downpipe apparatus, the use of thin-film evaporators or the use of floor, filled and packed columns and their conditions of use cannot however be directly extrapolated to polymer polyols, as the substances to be separated are essentially different compounds. Furthermore polymer polyols under the same operating conditions and temperatures up to 160° C. exhibit significantly higher viscosities of up to 500 mPas than polyether polyols (up to 60 mPas) and aqueous polymer dispersions (up to 10 mPas).

Patent Application DE-A-198 28 183 is concerned with the stripping of aqueous polymer dispersions and suspensions in which the removal of volatile constituents by chemical deodorization, followed by a physical deodorization preferably with steam in countercurrent columns is described. The removal of monomers and low-boiling components by physical deodorization is also described in Patent Application DE-A 197 16 373. This is preferably carried out with steam on weep-type or cross-current perforated trays, the structural details of which are disclosed in the patent. Countercurrent columns with weep-type or cross-current perforated trays for the removal of undesired organic components are also described in DE-C 198 47 115. Preferably gaseous substances, particularly preferably steam, are used as stripping agents.

Patent Application EP-A 0 982 341 describes a process for the production of polyether polyols, in which these are worked up by a combination of reactive-distillative steps. The distillative step consists of a combination of atmospheric pressure columns and vacuum columns operated with inert gas, preferably nitrogen.

In EP-A 0 819 712, a process for the production of polyurethane flexible foams is described. In this case the purification of polyols is carried out in a combined thermal-distillative step in surface-enlarging devices, optionally using inert gas. A characteristic features is that the treatment is carried out with a maximum 0.1 wt. % of water, preferably in the anhydrous state.

In EP-A 0 864 598, a thermal-distillative treatment step is described for polyether polyols by employing a countercurrent column and using a liquid and/or gaseous purification agent that is highly insoluble in the polyether polyol. $CO_2$ and nitrogen are mentioned as purification agents.

In U.S. Pat. No. 6,060,627, the removal of secondary products from a polyol (propoxylated glycerol) in a countercurrent column with ordered packings is described. The secondary products allyl alcohol, propylene glycol as well as monoethers and diethers of allyl alcohol are removed from the polyol by using steam or nitrogen as stripping agent.

Neither a stripping of pure polyether polyols nor polymer-filled polyether polyols in packed columns using steam as stripping agent is therefore known from the prior art.

SUMMARY OF THE INVENTION

The present invention therefore provides a process for the purification of polymer polyols that can be successfully used at temperatures of <160° C. and ensures a reduction of acrylonitrile, styrene as well as the residual amounts of optionally used chain regulator, and of occurring recombination products of the initiator when azo initiators are used, to levels of <25 ppm acrylonitrile, <50 ppm styrene, <50 ppm chain regulator and <280 ppm of recombination products. In addition the yellowness index of the polymer polyol purified in this way is not above 20 and the residual content of water is not above 1000 ppm. These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
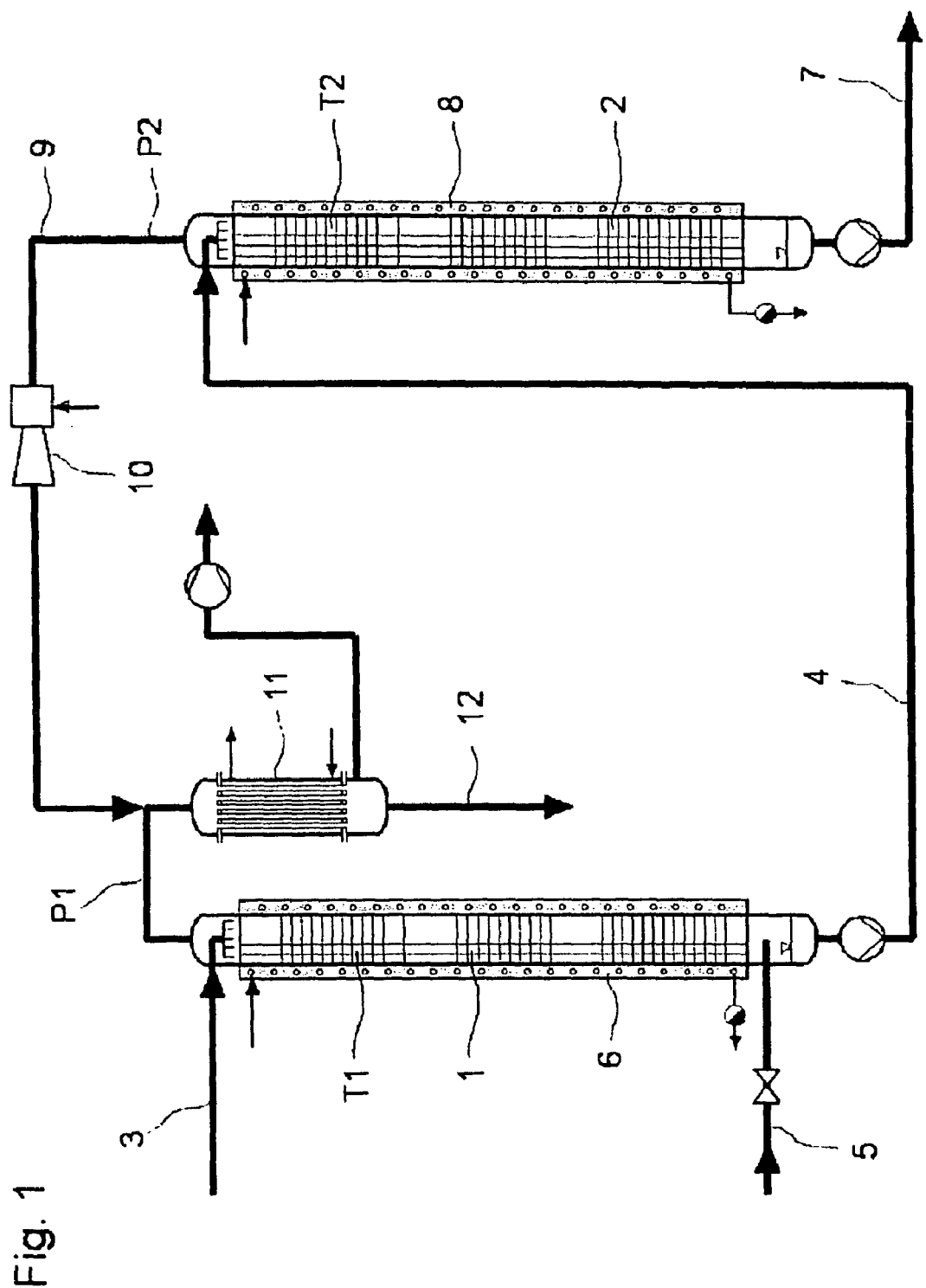
FIG. 1 is a diagram of one embodiment of the inventive process.

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The present invention provides a process for the purification of a polymer polyol, involving removing volatile constituents by means of superheated steam using packed columns, from the polymer polyol and freeing the purified polymer polyol obtained in step A), if necessary, from water that is still contained therein by passing through a packed column, wherein in step A) a liquid distributor with a droplet site density of more than 400 droplet sites per m² of column cross-section feeds the polymer polyol, and the temperature of the process is less than or equal to 160° C.

Polymer polyols that can be purified by the process according to the present invention are preferably polymer-filled polyether or polyester polyols, particularly preferably polymer-filled polyether polyols.

Such polymer polyols may be produced by dissolving or dispersing one or more olefinically unsaturated monomers in a base polyol and then polymerizing the monomers by means of free-radical initiators, a stable dispersion of polymer particles in the base polyol being formed.

If polyether polyols are used as base polyols, then these preferably have mean OH functionalities of 1.5 to 8, preferably 2 to 6, more preferably 3 to 6.

These typically have OH numbers of 15 to 120 mg KOH/g, more preferably 20 to 60 KOH/g, most preferably 25 to 52 mg KOH/g.

Preferred polyether polyols are pure propylene oxide polyols and ethylene oxide/propylene oxide-based mixed ethers, which may also have ethylene oxide terminal blocks.

In this connection it is unimportant whether polyethers are used that have been produced via base catalysis, for example with KOH, or have been produced without a base, for example by means of double metal cyanide catalysts (DMC catalysts).

In the production of the polymer polyols ("PMPOs"), styrene and acrylonitrile are preferably used as olefinically unsaturated monomers.

As initiators there may be used free-radical initiators, preferably azo initiators such as 2,2-azodi(isobutyronitrile) or 2,2-azodi(2-methylbutyronitrile) or organic peroxides such as tert.-amyl peroxy-2-ethyl hexanoate or tert.-butyl peroxipivalate.

If azo initiators are used so-called recombination products of the initiator may be formed as secondary products during the course of the polymerization. This occurs as a rule after the decomposition of the initiator and release of $N_2$ by recombination of the two remaining alkyl radicals to form a dinitrile.

If organic peroxides are used as initiators, inter alia organic acids, alcohols, ketones or aldehydes may be formed during the course of the polymerization.

In addition chain regulators such as alcohols or mercaptans and/or stabilizers or macromers may be employed.

The polymer polyols of the aforementioned type used in the process according to the invention preferably have filler contents of 10 to 60 wt. %, more preferably 20 to 50 wt. %, most preferably 25 to 45 wt. %.

They may be produced continuously or by a semi-batch process, in which connection the procedure may comprise one or more stages.

Their dynamic viscosity at 25° C. (measured according to DIN EN ISO 3219 in a rotary viscometer with DIN test bodies) is preferably 1000 to 8000 mPas, more preferably 1500 to 6500 mPas, most preferably 1800 to 6000 mPas.

Columns which are loaded in the active section with axially aligned packed internal fittings which enlarge substance interfaces are preferred as separation apparatus in the process according to the invention. The columns may be provided with a bottom and with a section for droplet separation at the head of the column. The columns may furthermore be equipped with a device for redistribution of the liquid as well as for steam distribution. The diameter of the columns and the length of the active sections are normally determined by calculation or experimentally having regard to the liquid and gas loading, the tolerable pressure loss, and the required product purity.

Structured packings and bulk filler materials, preferably packings, particularly preferably packings having a strip-shaped lamellar structure, may be used as internal fittings. The specific surface is in this connection preferably 150 to 500 m²/m³, more preferably 230 to 450 m²/m³.

In the columns a liquid distributor is preferably used that has a droplet site density of 450 to 850, more preferably 500 to 700 droplet sites per m² of column cross-section.

The steam used as stripping agent in the process is characterized in that its operating temperature at the operating pressure lies above the thermodynamically defined dew point. It is therefore also termed superheated steam.

To maintain the fluid temperature constant and to avoid condensation of the superheated steam used as stripping agent, the column jacket is normally adequately insulated over the whole length of the apparatus, preferably accompanied by secondary heating.

The liquid loading referred to the column cross-section is preferably 0.3 to 8 m³/m² hour, more preferably 0.5 to 6 m³/m² hour, most preferably 0.5 to 3 m³/m² hour.

The stripping agent stream referred to the PMPO mass flow is preferably 5 to 40%, more preferably 10 to 30%, most preferably 10 to 20%.

Preferably the process according to the invention is carried out in such a way that at least the temperature of the preheated PMPO, of the superheated steam or of the jacket of the column is 100° to 160° C., more preferably 110° to 150° C. and most preferably 120° to 140° C. Particularly preferably the temperature of the preheated PMPO as well as the temperature of the superheated steam and of the jacket of the column lie within the aforementioned range.

The operating pressure at the head of the column in stage A) is in this connection preferably 10 to 100 mbar, more preferably 10 to 50 mbar, most preferably 20 to 30 mbar.

The pressure at the head of the column in stage B), where this is employed, is reduced by 5 to 50 mbar compared to the first column.

Preferably the polymer polyols produced by the process according to the invention have a residual water content of ≦1500 ppm, more preferably ≦1000 ppm, most preferably ≦500 ppm.

Preferably the polymer polyols treated by the process according to the invention have a yellowness index of ≦25, more preferably ≦20, most preferably ≦16, measured according to DIN 5033 and calculated according to DIN 6167 and ASTM E 313.

By using the process according to the invention, it is possible to produce polymer polyols with contents of acrylonitrile of ≦25 ppm, styrene of ≦50 ppm, optionally employed chain regulator of ≦50 ppm, and occurring recombination product of the free-radical starter when azo initiators are used, of ≦280 ppm. More preferably the residual contents are ≦10 ppm of acrylonitrile, ≦20 ppm of styrene, ≦20 ppm of chain regulator and ≦150 ppm of recombination product of the free-radical starter, most preferably ≦5 ppm acrylonitrile, ≦15 ppm of styrene, ≦15 ppm of chain regulator and ≦100 ppm of recombination product of the free-radical starter.

In a preferred embodiment the process is operated as illustrated in FIG. 1. FIG. 1 shows the two-stage working-up process with the stripper (1) and the degassing column (2), both of which are operated under a vacuum. Both columns are filled with an ordered packing or with filler materials. The polymer polyol (3) charged with secondary products, monomers and possibly further starting substances is loaded by means of a liquid distributor at the head of the stripper and flows to the bottom of the column, where it is withdrawn (4) as purified product. The stripping steam flows in countercurrent to the polymer polyol to the head of the column, and is fed (5) to the stripper in the bottom of the column.

The stripper is operated isothermally, in which added polymer solution/dispersion, stripping steam and column jacket are maintained at the same column temperature (T1). For this purpose the column jacket (6) is maintained at a constant temperature over its whole length with steam, as illustrated in FIG. 1, or with a heating medium or electrically. This column temperature should lie in a range in which on the one hand the viscosity of the polymer solution/dispersion is as low as possible, and on the other hand the product is not damaged. The column vacuum (P1) is chosen so that the steam is superheated and therefore does not condense in the column.

Further low boiling point compounds and the water entrained by the stripping are separated in the degassing column (2). For this purpose the polymer polyol (4) is loaded at the head of the degassing column and is withdrawn at the bottom (7) of the column after completion of the degassing. The degassing column is likewise operated isothermally, in which the column jacket (8), as in the case of the stripper, is maintained at a constant temperature over its whole length with steam, as illustrated in FIG. 1, or with a heating medium or electrically. The column temperature (T2) of the degassing column should as far as possible be the same as the column temperature of the stripper (T1), though it may be at most 10° below this value. The vacuum of the degassing column (P2) must be less than the vacuum of the stripper (P1).

The vapors from the degassing column (9) are compressed by means of a compressor (10), in the simplest case a steam jet as shown in FIG. 1, to the pressure of the stripper (P1). The vapors from the stripper and degassing column are then jointly condensed in the condenser (11). The condensate (12) can be fed directly to the waste water processing stage.

Figure 2:
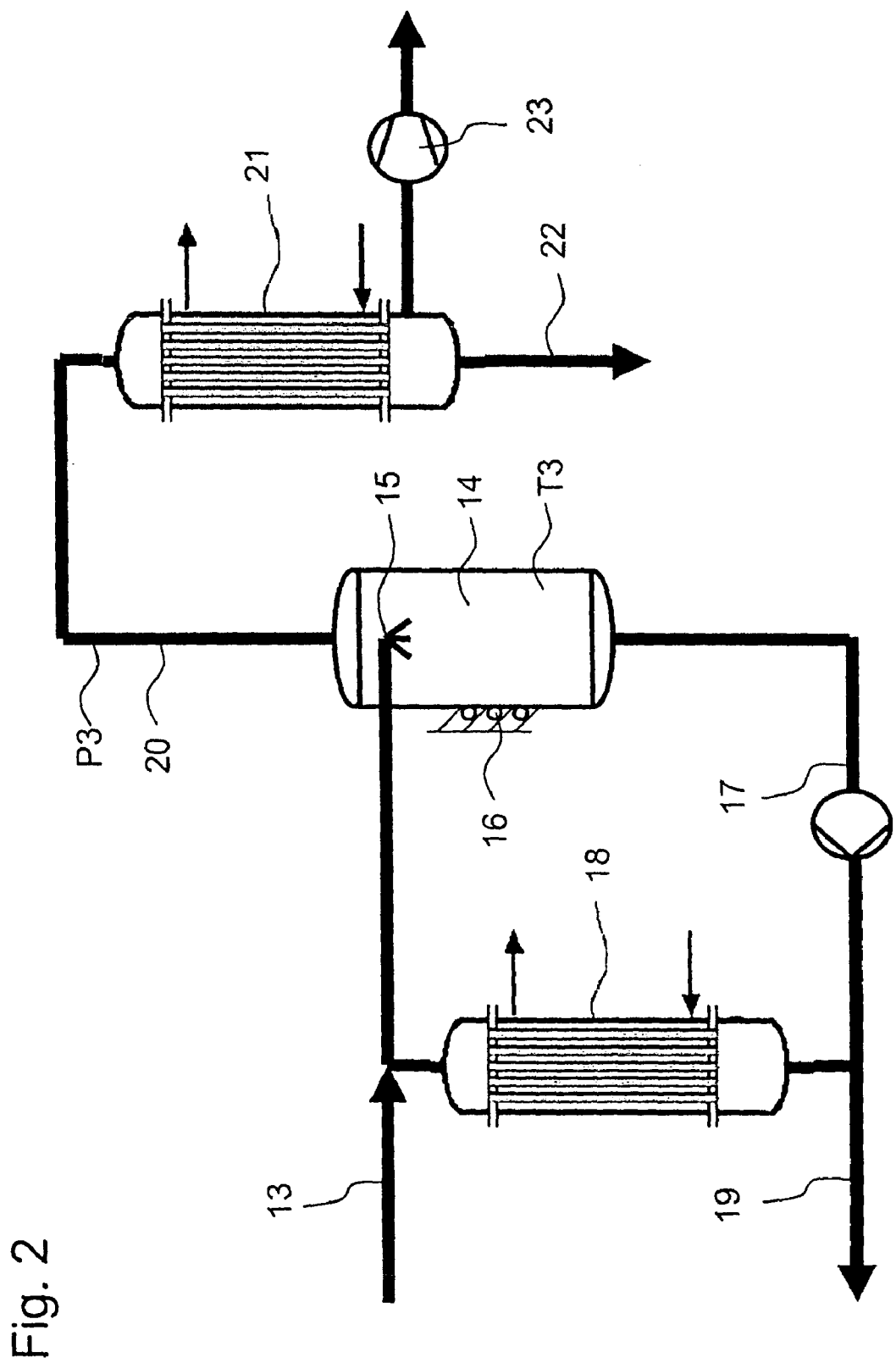
FIG. 2 is a diagram of another embodiment of the inventive process including a pressure release stage upstream of the stripper.

The proportion of low boiling point compounds, i.e. compounds that at 10 to 100 mbar, more preferably 10 to 50 mbar, have a boiling point of less than 160° C., more preferably less than 130° C., in the feed to the stripper should not exceed 2 wt. % referred to the feed, since otherwise too much steam condenses and can no longer be satisfactorily separated from the polymer solution/dispersion by the degassing. For economic reasons it is convenient in the case of relatively large amounts of low boiling point compounds to connect for example a pressure release stage upstream of the stripper. The polymer solution/dispersion (13) charged with relatively large amounts of solvent is then fed, as illustrated in FIG. 2, to a pressure release vessel (14), if necessary via a liquid distributor (15). The adiabatic pressure release evaporation takes place as a result of the pressure (P3) reduced with a vacuum pump (23) and as a result of the perceived heat contained in the stream (13). In addition heat may be applied as required by direct heating of the vessel (14) via attached heating coils (16) and/or by heating a circulating pumped stream (17) by means of an external heat exchanger (18). The polymer polyol stream (19) depleted of low boiling point compounds is withdrawn and fed to the stripping column (see FIG. 1). The vapors (20) formed in the pressure release are in this case condensed with an external condenser (21). Since the distillator stream (22) contains, on account of the process, only minor amounts of water, it can be recycled to the process after being worked up.

EXAMPLES

The dynamic viscosity was measured at the relevant operating temperature of the column according to DIN EN ISO 3219 in a rotary viscometer with DIN test bodies.

For the separation ordered packings having a strip-shaped lamellar structure and a specific surface of 230 to 450 m$^2$/m$^3$ (ROMBOPAK 9M type, Kühni Company, Allschwil, Switzerland) were used.

Comparison Example 1

500 kg of PMPO with a dynamic operating viscosity of 200 mPas, a yellowness index of 8.65 and a proportion of volatile components of 0.1 wt. % acrylonitrile, 0.7 wt. % isopropanol, 0.4 wt. % styrene, 0.2 wt. % recombination product and 0.05 wt. % water were stripped in a pilot plant column (diameter 150 mm, filling height 3 mm, filling—ROMBOPAK 9M). The column distributor generated, with seven droplet sites, a trickling density of 400/m$^2$.

The stripper was operated continuously with a head pressure of 30 bar. The PMPO added at the head of the column was preheated to 120° C., the steam flowing in countercurrent thereto was superheated to 138° C., and the column jacket was maintained at 125° C. by an electrical supplementary heating device.

The feed amount of PMPO was 100 kg/hour (trickling density 6 m$^3$/m$^2$) with a stripping steam amount of 12 kg/hour. The pressure loss in the column was 12 mbar. The proportion of the volatile constituents in the PMPO fell after the stripping to 5 ppm acrylonitrile, 40 ppm isopropanol, 87 ppm styrene and 600 ppm recombination products; the water content on the other hand rose to 0.06 wt. %. The yellowness index of the stripped product was 8.95.

Comparison Example 2

Under the same experimental conditions as in comparison Example 1, but with a head pressure of 93 mbar, a PMPO feed temperature of 130° C., a column jacket temperature of 140° C. and a feed amount of 146 kg/hour, the residual amounts of volatile components rose compared to comparative Example 1 to 15 ppm acrylonitrile, 85 ppm isopropanol, 140 ppm styrene and 1150 ppm recombination product. The water content was ca. 0.1 wt. %. The yellowness index rose in the stripping from 8.75 to 9.0.

Comparison Example 3

2 kg PMPO with a dynamic operating viscosity of 370 mPas and a composition of 0.1 wt. % acrylonitrile, 0.7 wt. % isopropanol, 0.4 wt. % styrene and 0.2 wt. % recombination product were heated to 130° C. in a 2.5 liter capacity glass reactor and then heated for a further 90 minutes at this temperature and under a pressure of 30 mbar. The proportion of the volatile constituents in the PMPO fell to 40 ppm acrylonitrile, 130 ppm isopropanol, 1300 ppm styrene and 1700 ppm recombination product. The yellowness index rose in the stripping from 10.0 to 10.9.

Comparison Example 4

2 kg PMPO with a dynamic operating viscosity of 200 mPas and a composition of 0.1 wt. % acrylonitrile, 0.7 wt. % isopropanol, 0.4 wt. % styrene and 0.2 wt. % recombination product were heated to 130° C. in a 2.5 liter capacity glass reactor and then heated for a further 90 minutes at this temperature and under a pressure of 30 mbar. The proportion of the volatile constituents in the PMPO fell to 60 ppm acrylonitrile, 240 ppm isopropanol, 1500 ppm styrene and 1670 ppm recombination product. The yellowness index rose in the stripping from 9.0 to 10.6.

Example 1 According to the Invention 500 kg PMPO with a dynamic operating viscosity of 200 mPas, a yellowness index of 11.6 and a proportion of volatile constituents of 0.1 wt. % acrylonitrile, 0.7 wt. % isopropanol, 0.4 wt. % styrene, 0.05 wt. % recombination product and 0.05 wt. % water were stripped in a pilot plant column (diameter 150 mm, filling height 3 m, filling—ROMBOPAK 9M). The column distributor generated, with 12 droplet sites, a trickling density of 679/m$^2$.

The stripper was operated continuously at a head pressure of 30 mbar. The PMPO added at the head of the column was preheated to 120° C., the steam flowing in countercurrent thereto was superheated to 136° C., and the column jacket was maintained at 130° C. by an electrical supplementary heating device.

The feed amount of PMPO was 50 kg/hour (trickling density 3m$^3$/m$^2$) with a stripping steam amount of 10 kg/hour. The pressure loss in the column was ca. 4 mbar. The proportion of the volatile constituents in the PMPO fell after the stripping to <1 ppm acrylonitrile, 10 ppm isopropanol, 6 ppm styrene and <100 ppm recombination product; the water content scarcely increased. The yellowness index of the stripped product was 12.1.

Example 2 According to the Invention 1000 kg PMPO with a dynamic operating viscosity of 370 mPas and a composition of 0.1 wt. % acrylonitrile, 0.7 wt. % isopropanol, 0.4 wt. % styrene, 0.2 wt. % recombination product and 0.05% water were stripped in a pilot plant column (diameter 150 mm, filling height 3 m, filling—ROMBOPAK 9M). The column distributor generated, with 12 droplet sites, a trickling density of 679/m$^2$.

The stripper was operated continuously at a head pressure of 30 mbar. The PMPO added at the head of the column was preheated to 120° C., the steam flowing in countercurrent thereto was superheated to 140° C., and the column jacket was maintained at 130° C. by an electrical supplementary heating device.

The feed amount of PMPO was 40 kg/hour (trickling density 2.8 m$^3$/m$^2$) with a stripping steam amount of 8 kg/hour. The proportion of the volatile constituents in the PMPO fell after the stripping to <1 ppm acrylonitrile, 2 ppm isopropanol, 7 ppm styrene and 270 ppm recombination product; the water content rose on the other hand to 0.1%.

Example 3 According to the Invention

The stripper was operated continuously under the same experimental conditions as in Example 2 according to the invention, but with a feed amount of PMPO of 30 kg/hour (trickling density 1.8 m$^3$/m$^2$) and a stripping steam amount of 6 kg/hour. The proportion of the volatile constituents in the PMPO fell after the stripping to <1 ppm acrylonitrile, <1 ppm isopropanol, <1 ppm styrene and ≦100 ppm recombination product; the water content rose however to 0.1%.

The subsequent degassing of the stripped PMPOs of the examples according to the invention was carried out in the same pilot plant column as the stripping itself, at a head pressure of 10 mbar. The PMPO added at the head of the column was preheated to 120° C. and the column jacket was maintained at 120° C. by an electrical supplementary heating device. The feed amount of polyether was 100 kg/hour with 0.1% water. After the degassing the water content was 200 ppm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the purification of a polymer polyol, comprising:
   A) removing volatile constituents by means of superheated steam using packed columns, from the polymer polyol; and
   B) freeing the purified polymer polyol obtained in step A), if necessary, from water that is still contained therein by passing through a packed column,
   wherein in step A) a liquid distributor with a droplet site density of more than 400 droplet sites per m$^2$ of column cross-section feeds the polymer polyol, and the temperature of the process is less than or equal to 160° C.

2. The process according to claim 1, wherein the columns further include packings having a strip-shaped lamellar structure and a specific surface of about 230 to about 450 m$^2$/m$^3$.

3. The process according to claim 1, wherein liquid loading with reference to the column cross-section is from about 0.5 to about 3 m$^3$/m$^2$ hour in stage A) and optionally B).

4. The process according to claim 1, wherein the stripping agent stream is about 10 to about 20% referred to the PMPO mass flow stream in step A) and optionally B).

5. The process according to claim 1, wherein polymer polyols purified by the process have a residual water content of ≦500 ppm.

6. The process according to claim 1, wherein polymer polyols purified by the process have contents of acrylonitrile of ≦25 ppm, styrene of ≦50 ppm, optionally employed chain regulator of ≦50 ppm, and recombination product of the free-radical azo initiators, of ≦280 ppm.

7. The process according to claim 1, wherein basic polymer polyols are produced by dissolving or dispersing free-radically polymerizable monomers in a base polyol and then polymerizing these monomers by means of free-radical initiators so that a stable dispersion of polymer particles in the base polyol is formed.

8. The process according to claim 7, wherein the base polyol is a polyether polyol.

9. The process according to claim 7, wherein the free-radically polymerizable monomers are selected from the group consisting of styrene and acrylonitrile.

10. The process according to claim 7, wherein the free-radical starters are selected from the group consisting of azo initiators and organic peroxides.

* * * * *